(12) United States Patent
Naqvi

(10) Patent No.: US 9,160,570 B2
(45) Date of Patent: Oct. 13, 2015

(54) SYSTEMS AND METHOD FOR ENABLING IP SIGNALING IN WIRELESS NETWORKS

(71) Applicant: Aylus Networks, Inc., Westford, MA (US)

(72) Inventor: Shamim A. Naqvi, Morristown, NJ (US)

(73) Assignee: Aylus Networks, Inc., Westford, MA (US)

( * ) Notice: Subject to any disclaimer, the term of this patent is extended or adjusted under 35 U.S.C. 154(b) by 301 days.

(21) Appl. No.: 13/873,439

(22) Filed: Apr. 30, 2013

(65) Prior Publication Data

US 2013/0308634 A1    Nov. 21, 2013

Related U.S. Application Data

(63) Continuation of application No. 11/709,469, filed on Feb. 22, 2007, now Pat. No. 8,432,899.

(51) Int. Cl.
| | |
|---|---|
| *H04L 12/66* | (2006.01) |
| *H04W 4/00* | (2009.01) |
| *H04W 4/14* | (2009.01) |

(Continued)

(52) U.S. Cl.
CPC ................ *H04L 12/64* (2013.01); *H04L 12/66* (2013.01)

(58) Field of Classification Search
CPC ............................... H04L 12/66; H04L 12/64
USPC .......... 370/310, 338, 349, 352–356; 379/100, 379/88.12; 455/466, 332; 709/217–218
See application file for complete search history.

(56) References Cited

U.S. PATENT DOCUMENTS

| 4,736,407 A | 4/1988 | Dumas |
| 4,925,311 A | 5/1990 | Neches et al. |

(Continued)

FOREIGN PATENT DOCUMENTS

| EP | 1672893 | 9/1988 |
| EP | 1435748 | 7/2004 |

(Continued)

OTHER PUBLICATIONS

Definition of "proxy" from dictionary.com, http://discctionary.reference.com/browse/proxy, printed Mar. 14, 2009 (5 pages).

(Continued)

*Primary Examiner* — Wutchung Chu
(74) *Attorney, Agent, or Firm* — Stuart H. Mayer; Mayer & Williams PC

(57) ABSTRACT

Under one aspect, a system for transmitting an IP-based message from an initiator to a receiver lacking an IP address via a packet-switched (PS) network capable of communicating IP-based messages and a circuit-switched (CS) network capable of communicating non-IP-based messages, includes: a serving node in communication with the PS network and the CS network, the serving node including logic to: receive the IP-based message from the initiator over the PS network; generate a trigger message responsive to the IP-based message, the trigger message including a non-IP-based message including instructions for the receiver to initiate a connection to the PS network; and transmit the trigger message to the receiver via the CS network, and the receiver including logic to initiate a connection to the PS network and to receive the IP-based message responsive to the trigger message. Methods are also disclosed.

34 Claims, 5 Drawing Sheets

(51) Int. Cl.
*H04W 84/12* (2009.01)
*H04M 1/64* (2006.01)
*H04B 7/216* (2006.01)
*G06F 15/16* (2006.01)
*H04L 12/64* (2006.01)

(56) References Cited

U.S. PATENT DOCUMENTS

| | | | |
|---|---|---|---|
| 6,014,706 A | 1/2000 | Cannon | |
| 6,018,662 A | 1/2000 | Periyalwar et al. | |
| 6,032,053 A | 2/2000 | Schroeder et al. | |
| 6,047,194 A | 4/2000 | Andersson | |
| 6,061,572 A | 5/2000 | Laiho | |
| 6,067,529 A | 5/2000 | Ray et al. | |
| 6,374,112 B1 | 4/2002 | Widegren et al. | |
| 6,574,326 B1 | 6/2003 | Wong et al. | |
| 6,608,832 B2 | 8/2003 | Forslow | |
| 6,650,705 B1 | 11/2003 | Vetro et al. | |
| 6,665,711 B1 | 12/2003 | Boyle | |
| 6,675,196 B1 | 1/2004 | Kronz | |
| 6,694,145 B2 | 2/2004 | Riikonen et al. | |
| 6,782,412 B2 | 8/2004 | Brophy et al. | |
| 6,795,912 B1 | 9/2004 | Itoh et al. | |
| 6,847,632 B1 | 1/2005 | Lee | |
| 6,857,021 B1 | 2/2005 | Schuster et al. | |
| 6,888,828 B1 | 5/2005 | Partanen et al. | |
| 6,950,655 B2 | 9/2005 | Hunkeler et al. | |
| 7,024,198 B2 | 4/2006 | Knaebchen et al. | |
| 7,076,554 B1 | 7/2006 | Kobayashi | |
| 7,194,235 B2 | 3/2007 | Nykanen | |
| 7,277,416 B1 | 10/2007 | Chang | |
| 7,299,049 B2 | 11/2007 | Jagadeesan | |
| 7,301,938 B2 | 11/2007 | Ejzak | |
| 7,353,021 B2 | 4/2008 | Ejzak et al. | |
| 7,519,075 B2 | 4/2009 | Tu | |
| 7,637,424 B2 | 12/2009 | Silverbrook | |
| 7,640,038 B2 | 12/2009 | Reddy | |
| 7,720,489 B2 | 5/2010 | Engelhart, Sr. | |
| 7,729,298 B2 | 6/2010 | Velagaleti et al. | |
| 7,856,226 B2 | 12/2010 | Wong et al. | |
| 8,065,402 B2 | 11/2011 | Chen et al. | |
| 8,170,534 B2 | 5/2012 | Naqvi et al. | |
| 2001/0043592 A1* | 11/2001 | Jimenez et al. | 370/352 |
| 2002/0059416 A1 | 5/2002 | Tuunanen | |
| 2002/0064274 A1 | 5/2002 | Tuunanen et al. | |
| 2002/0140726 A1 | 10/2002 | Schwartz | |
| 2002/0181462 A1 | 12/2002 | Surdila et al. | |
| 2003/0026245 A1 | 2/2003 | Ejzak | |
| 2003/0027569 A1 | 2/2003 | Ejzak | |
| 2003/0027595 A1 | 2/2003 | Ejzak | |
| 2003/0055974 A1 | 3/2003 | Brophy et al. | |
| 2003/0134636 A1 | 7/2003 | Sundar et al. | |
| 2003/0134640 A1 | 7/2003 | Kim et al. | |
| 2003/0144008 A1 | 7/2003 | Rehkopf | |
| 2003/0193426 A1 | 10/2003 | Vidal | |
| 2003/0210683 A1 | 11/2003 | Bais et al. | |
| 2004/0008669 A1 | 1/2004 | Bos et al. | |
| 2004/0019539 A1 | 1/2004 | Raman et al. | |
| 2004/0019901 A1 | 1/2004 | Spio | |
| 2004/0043766 A1 | 3/2004 | Sashihara | |
| 2004/0043776 A1 | 3/2004 | Tuomela et al. | |
| 2004/0047437 A1 | 3/2004 | Hamiti et al. | |
| 2004/0048612 A1 | 3/2004 | Virtanen et al. | |
| 2004/0062230 A1 | 4/2004 | Taylor | |
| 2004/0068574 A1 | 4/2004 | Requena et al. | |
| 2004/0076145 A1 | 4/2004 | Kauhanen et al. | |
| 2004/0083195 A1 | 4/2004 | McCord et al. | |
| 2004/0107143 A1 | 6/2004 | Niemi | |
| 2004/0127251 A1 | 7/2004 | Thakkar et al. | |
| 2004/0162892 A1 | 8/2004 | Hsu | |
| 2004/0190498 A1 | 9/2004 | Kallio et al. | |
| 2004/0193700 A1 | 9/2004 | Westman et al. | |
| 2004/0193725 A1 | 9/2004 | Costa-Requena et al. | |
| 2004/0205212 A1 | 10/2004 | Huotari et al. | |
| 2004/0218571 A1 | 11/2004 | Pascazi | |
| 2004/0219912 A1 | 11/2004 | Johansson et al. | |
| 2004/0240430 A1 | 12/2004 | Lin | |
| 2004/0249887 A1 | 12/2004 | Garcia-Martin et al. | |
| 2004/0249962 A1 | 12/2004 | Lecomte | |
| 2004/0252673 A1 | 12/2004 | Ejzak et al. | |
| 2004/0252674 A1 | 12/2004 | Soininen et al. | |
| 2004/0261116 A1 | 12/2004 | McKeown et al. | |
| 2005/0021494 A1 | 1/2005 | Wilkinson | |
| 2005/0025047 A1 | 2/2005 | Bodin | |
| 2005/0025163 A1 | 2/2005 | Christie | |
| 2005/0043020 A1 | 2/2005 | Lipsanen et al. | |
| 2005/0047399 A1 | 3/2005 | Lee et al. | |
| 2005/0050194 A1 | 3/2005 | Honeisen et al. | |
| 2005/0058125 A1 | 3/2005 | Mutikainen et al. | |
| 2005/0063329 A1 | 3/2005 | Lee | |
| 2005/0083909 A1 | 4/2005 | Kuusinen et al. | |
| 2005/0089020 A1 | 4/2005 | Ahlback et al. | |
| 2005/0136926 A1 | 6/2005 | Tammi | |
| 2005/0141484 A1 | 6/2005 | Rasanen | |
| 2005/0170861 A1 | 8/2005 | Niemi et al. | |
| 2005/0180394 A1 | 8/2005 | Kautz | |
| 2005/0190772 A1 | 9/2005 | Tsai et al. | |
| 2005/0213606 A1 | 9/2005 | Huang et al. | |
| 2005/0227681 A1 | 10/2005 | Li | |
| 2005/0237933 A1 | 10/2005 | Marjelund et al. | |
| 2005/0243870 A1 | 11/2005 | Balogh et al. | |
| 2005/0245261 A1 | 11/2005 | Ejzak | |
| 2005/0271011 A1 | 12/2005 | Alemany et al. | |
| 2005/0286531 A1 | 12/2005 | Tuohino et al. | |
| 2006/0007900 A1 | 1/2006 | Syvain | |
| 2006/0015812 A1 | 1/2006 | Cunningham et al. | |
| 2006/0025151 A1 | 2/2006 | Karaoguz et al. | |
| 2006/0031888 A1 | 2/2006 | Sparrell | |
| 2006/0062206 A1 | 3/2006 | Krishnaswamy | |
| 2006/0083199 A1 | 4/2006 | Yang | |
| 2006/0089143 A1 | 4/2006 | Jagadeesan | |
| 2006/0104262 A1 | 5/2006 | Kant et al. | |
| 2006/0114987 A1 | 6/2006 | Roman | |
| 2006/0120287 A1 | 6/2006 | Foti et al. | |
| 2006/0120339 A1 | 6/2006 | Akiyama | |
| 2006/0121902 A1 | 6/2006 | Jagadeesan et al. | |
| 2006/0126562 A1 | 6/2006 | Liu | |
| 2006/0136557 A1 | 6/2006 | Schaedler et al. | |
| 2006/0140150 A1 | 6/2006 | Olvera-Hernandez et al. | |
| 2006/0155814 A1 | 7/2006 | Bennett et al. | |
| 2006/0161512 A1 | 7/2006 | Schaedler et al. | |
| 2006/0164550 A1 | 7/2006 | Yoshimoto et al. | |
| 2006/0165050 A1 | 7/2006 | Erhart et al. | |
| 2006/0183478 A1 | 8/2006 | Jagadeesan et al. | |
| 2006/0193448 A1 | 8/2006 | Donoghue et al. | |
| 2006/0209768 A1 | 9/2006 | Yan et al. | |
| 2006/0246903 A1 | 11/2006 | Kong et al. | |
| 2006/0256751 A1 | 11/2006 | Jagadeesan et al. | |
| 2006/0258394 A1 | 11/2006 | Dhillon et al. | |
| 2006/0262806 A1 | 11/2006 | Bouazizi | |
| 2006/0276179 A1 | 12/2006 | Ghaffari et al. | |
| 2006/0291412 A1 | 12/2006 | Naqvi et al. | |
| 2006/0291419 A1 | 12/2006 | McConnell et al. | |
| 2006/0291437 A1 | 12/2006 | Naqvi et al. | |
| 2006/0291484 A1 | 12/2006 | Naqvi et al. | |
| 2006/0291487 A1 | 12/2006 | Naqvi et al. | |
| 2006/0291488 A1 | 12/2006 | Naqvi et al. | |
| 2006/0291489 A1 | 12/2006 | Naqvi et al. | |
| 2006/0294244 A1 | 12/2006 | Naqvi et al. | |
| 2007/0002902 A1 | 1/2007 | Hannuksela | |
| 2007/0008913 A1 | 1/2007 | Naqvi et al. | |
| 2007/0008951 A1 | 1/2007 | Naqvi et al. | |
| 2007/0014281 A1 | 1/2007 | Kant | |
| 2007/0033286 A1 | 2/2007 | Min | |
| 2007/0050510 A1 | 3/2007 | Jiang | |
| 2007/0053343 A1 | 3/2007 | Suotula et al. | |
| 2007/0053346 A1 | 3/2007 | Bettis et al. | |
| 2007/0064676 A1 | 3/2007 | Peisa et al. | |
| 2007/0066347 A1 | 3/2007 | Silverbrook et al. | |
| 2007/0067807 A1 | 3/2007 | O'Neil | |
| 2007/0091855 A1 | 4/2007 | Karaoguz et al. | |
| 2007/0110043 A1 | 5/2007 | Girard | |
| 2007/0111752 A1 | 5/2007 | Pazhyannur | |
| 2007/0155310 A1 | 7/2007 | Borcic | |

(56) References Cited

U.S. PATENT DOCUMENTS

| | | |
|---|---|---|
| 2007/0165572 A1 | 7/2007 | Lenzarini |
| 2007/0165599 A1 | 7/2007 | Skog et al. |
| 2007/0174471 A1 | 7/2007 | Van Rossum |
| 2007/0197227 A1 | 8/2007 | Naqvi et al. |
| 2007/0201435 A1 | 8/2007 | Fisher |
| 2007/0207782 A1 | 9/2007 | Tran |
| 2007/0207802 A1 | 9/2007 | Palmer et al. |
| 2007/0207804 A1 | 9/2007 | Sharma et al. |
| 2007/0217349 A1 | 9/2007 | Fodor et al. |
| 2007/0217366 A1 | 9/2007 | Sagi et al. |
| 2007/0218924 A1 | 9/2007 | Burman et al. |
| 2007/0226344 A1 | 9/2007 | Sparrell et al. |
| 2008/0043717 A1 | 2/2008 | Bellora et al. |
| 2008/0075067 A1 | 3/2008 | Guglielmi et al. |
| 2008/0092178 A1 | 4/2008 | McNamara et al. |
| 2008/0130637 A1 | 6/2008 | Kant et al. |
| 2008/0162637 A1 | 7/2008 | Adamczyk |
| 2008/0261593 A1 | 10/2008 | Wong et al. |
| 2008/0276179 A1 | 11/2008 | Borenstein |
| 2008/0291902 A1 | 11/2008 | Chen |
| 2008/0291905 A1 | 11/2008 | Chakravadhanula et al. |
| 2008/0316998 A1 | 12/2008 | Procopio et al. |
| 2008/0317010 A1 | 12/2008 | Naqvi et al. |
| 2009/0055473 A1 | 2/2009 | Synnergren |
| 2013/0262583 A1 | 10/2013 | Naqvi et al. |
| 2013/0308634 A1 | 11/2013 | Naqvi et al. |

FOREIGN PATENT DOCUMENTS

| | | |
|---|---|---|
| EP | 1545129 | 6/2005 |
| WO | 01/54441 | 7/2001 |
| WO | 03/055913 | 7/2003 |
| WO | 2005/027460 | 3/2005 |
| WO | 2007/010070 | 1/2007 |
| WO | 2008/131109 | 9/2007 |
| WO | 2007/100735 | 10/2007 |
| WO | 2007/117730 | 10/2007 |
| WO | 2008/131118 | 10/2008 |
| WO | 2009/009167 | 1/2009 |

OTHER PUBLICATIONS

Nokia Corporation "Video Sharing, Enrich Your Voice Call with Video" Nov. 1, 2004. (12 pages).

GSM Association: "Video Share Service Definition 2.0" Mar. 27, 2007, retrieved on Jun. 2, 2010, 28 pages.

OSGi Service Platform, Mar. 2003, the Open Services Gateway Initiative, Release 3, pp. 345-356, 505, 513-526 (602 pages).

Radvision Eli Oee, Jan. 21, 2003, EE Times, Understanding the 3G-324M Spec: Part 1, pp. 1-6.

Cheng-Yue Chang, An H.323 Gatekeeper Prototype: Design, Implementation, and Performance Analysis, Dec. 2004, IEEE Transactions on Multimedia, vol. 6, No. 6, pp. 937-939.

* cited by examiner

SYSTEMS AND METHOD FOR ENABLING IP SIGNALING IN WIRELESS NETWORKS

BACKGROUND

1. Field of the Invention

This invention generally relates to wireless networks and to IP Multimedia Subsystem (IMS) networks.

2. Description of Related Art

Current wireless networks support circuit-switched (CS) and packet-switched (PS) connections. In some wireless networks, both types of connections may exist contemporaneously and be available to mobile handsets or user endpoints (UEs). In other wireless networks, a mobile handset may have access to either a CS connection or a PS connection but not both at the same time. Moreover, even if a mobile handset has a PS connection, it may lose packet connectivity due to a policy implemented by a network operator (e.g., in a situation where the operator has a limited number of IP addresses that need to be shared amongst a large number of handsets). In this case, because the mobile handset is no longer assigned an IP address, it is not reachable by addressing schemes based on IP addresses, i.e., it is not IP-accessible. In such situations, IP-based user-to-user signaling schemes such as SIP (Session Initiation Protocol) may become inoperable because one or more user handsets are no longer IP accessible.

CS and PS networks will now be described in greater detail. In a CS network such as PLMN, users' network mobile handsets are connected to Base Transceiver Stations (BTS) through a radio access network. The BTS in turn are connected to a plurality of Base Station Servers (BSC) that in turn are connected to a network of Mobile Switching Centers (MSC). The MSC provide wireless services to the users' handsets, and are also inter-connected with the Public Switched Telephone network (PSTN). This arrangement makes it possible for voice traffic to be carried between mobile handsets and landline telephone sets. The MSC in a wireless network effectively behaves as a switch that supports the mobility and roaming functions of a user's handset.

When a user's handset requests a telephone call or a service, such as voice mail, a prepaid call, or a toll-free call, it generates a "call event" at the MSC. Each call event can potentially "trigger" one or more Trigger Detection Points (TDP) in the MSC. When a call event triggers a particular TDP, the MSC sends a pre-specified message to a Service Control Function (SCF). The message includes, for example, the phone numbers of the calling and called parties, and the nature of the service request. The SCF then "fields" the message, i.e., service logic within the SCF responds appropriately to the message. In WIN/CAMEL implementations, the MSC and SCF communicate using standards-based protocols such as Transaction Capabilities Application Part (TCAP) from the family of protocols commonly referred to as Signaling System 7 (SS7).

For example, consider a "call origination" call event that happens when a user makes a new call request at the MSC. This call event triggers a corresponding TDP, causing the MSC to send a message with event-related information to the SCF, e.g., the calling and called numbers. The SCF then processes the message, e.g., by querying an internal or external database to verify that the calling party is authorized to initiate telephone calls. The SCF then responds back to the MSC with a message that indicates whether the call is "allowed" or "denied."

In a PS network, services are generally supported by IP Multimedia Subsystem (IMS). The IMS architecture manages the network with several control functions, i.e., functional entities. The Breakout Gateway Control Function (BGCF) is an inter-working function that handles legacy circuit-switched traffic. A new function called the Media Gateway Control Function (MGCF) controls the Media Gateway (MGW). The Media Resource Function Processor (MRFP), which is controlled by the Media Resource Control Function (MRFC), performs media processing functions. An IMS session is controlled by a logical function called the Call State Control Function (CSCF). It is logically partitioned into three functional entities, the Proxy, Interrogating and Serving CSCFs. The Proxy Call State Control Function (P-CSCF) is the first contact point for a user's handset. The Interrogating CSCF (I-CSCF) is mainly the contact point within an operator's network for all IMS connections destined to a subscriber of that network operator, or a roaming subscriber currently located within that network operator's service area. The Serving CSCF (S-CSCF) actually handles the session states in the network. "Third party" application servers (AS) provide services to the mobile handset, such as voice mail, via the S-CSCF. The IMS controls packet services among the different functional entities with signaling protocols such as Session Initiation Protocol (SIP), which is an IP-based signaling protocol designed for multimedia communications.

When a mobile handset first powers on, logic residing in the handset initiates a "registration" procedure with the IMS core, first by requesting the radio access network to assign it an IP address. After it receives an IP address, the mobile handset attempts to register as an IP-enabled endpoint with the IMS core, by sending a "register" request to the P-CSCF. Assuming that the handset is registering from a visiting domain, the P-CSCF then uses a Domain Name Server (DNS) to search for the handset's home domain S-CSCF. Once the P-CSCF locates the S-CSCF for the mobile handset, it passes the "register" request to that S-CSCF. The S-CSCF contacts the Home Subscriber Subsystem (HSS), which looks up the mobile handset's profile. This profile contains assorted information about the user, and what services the handset is authorized to use. A logical function in the S-CSCF called the "registrar" then authenticates the mobile handset, e.g., verifies that the handset is legitimate.

The S-CSCF also loads Service Point Triggers (SPT) from the handset's profile. The SPT define the appropriate action for the S-CSCF to take when the handset or an AS requests a transaction. For example, if the handset requests voice mail service, the SPT triggers the S-CSCF to provide the addresses of the voice mail AS for the handset. So long as the handset is powered on, the SPT for that handset are loaded into the S-CSCF, so a service request fires the appropriate trigger in the S-CSCF. The SPT are analogous to the above-described TDP in the CS network. The SPT and TDP both trigger an appropriate response from a controlling server, e.g., the MSC or S-CSCF. However, the TDP are more generally applicable to call requests and call related events such as dialed number, etc., and are not particular to the user's profile. The SPT are specific to the mobile handset, and are stored in the user's profile in the HSS and loaded into the S-CSCF when the handset registers.

If an entity wishes to engage in a transaction with the mobile handset, e.g., to send a message to the handset, the entity utilizes an AS to send a request for the transaction to the S-CSCF. This triggers an SPT in the S-CSCF, which recognizes the request as pertaining to a registered handset and sends the appropriate information to the handset. Other ASs may not know which S-CSCF to contact in order to engage in a transaction with a particular handset. In this case, the AS interrogate a Subscriber Location Function (SLF), which provides information about a handset's S-CSCF to the AS, which then contacts that S-CSCF as described above. If the handset wishes to request a service, it sends the request to the S-CSCF, e.g., using a SIP invite. This triggers an SPT in the S-CSCF, which then directs the service request to a particular Application Server (AS), which then provides the service to the handset. For example, if the user wants to initiate an IMS call, it sends a SIP invite message to the S-CSCF, which may then contact the AS responsible for IMS calls, called the Back-to-Back User Agent (B2BUA), which initiates the IMS call flow.

SUMMARY

The present invention provides systems and methods for enabling IP signaling in wireless networks. The systems and methods allow IP-based signaling schemes to function in mobile wireless environments without interruption, even if one or more mobile handsets become IP-inaccessible.

Under one aspect, a method of transmitting an IP-based message from an initiator to a receiver lacking an IP address via a packet-switched (PS) network capable of communicating IP-based messages, a circuit-switched (CS) network capable of communicating non-IP-based messages, and a serving node in communication with the PS network and the CS network, includes: generating an IP-based message at the initiator, the IP-based message intended for receipt by the receiver; transmitting the IP-based message from the initiator to the serving node via the PS network; responsive to the IP-based message, the serving node generating a trigger message, the trigger message including a non-IP-based message including instructions for the receiver to initiate a connection to the PS network; transmitting the trigger message from the serving node to the receiver via the CS network; responsive to the trigger message, the receiver initiating a connection to the PS network; and receiving at the receiver the IP-based message.

Some embodiments include one or more of the following features. The trigger message includes instructions for the receiver to pull the IP-based message from the serving node via the PS network after initiating a connection to the PS network. The trigger message includes the IP-based message. The trigger message includes instructions for the receiver to request the initiator to send any subsequent IP-based messages via the PS network. The initiator includes a network entity. The receiver includes a mobile handset. The initiator includes a mobile handset. The receiver includes a second mobile handset. The trigger message includes an SMS message. The serving node transmits the trigger message to the receiver via a Short Messaging Service Center (SMSC) in the CS network. The serving node obtains location information about the receiver from a Home Location Register (HLR) and then transmits the trigger message to the receiver via the CS network. The serving node transmits the trigger message to the receiver via a Home Location Register (HLR) in the CS network. The trigger message includes a Push Access Protocol (PAP) message. The serving node transmits the trigger message to the receiver via a Push Proxy Gateway (PPG) in the CS network. The PPG transmits the trigger message to the receiver via WAP Push technology. The trigger message includes an Unstructured Supplementary Services Data (USSD) message. The serving node transmits the trigger message to a Home Location Register (HLR) in the CS network using MAP/TCAP/SS7 protocol. The HLR delivers the trigger message to the receiver using "mobile terminated" call flow procedures.

Under another aspect, a system for transmitting an IP-based message from an initiator to a receiver lacking an IP address via a packet-switched (PS) network capable of communicating IP-based messages and a circuit-switched (CS) network capable of communicating non-IP-based messages, includes: a serving node in communication with the PS network and the CS network, the serving node including logic to: receive the IP-based message from the initiator over the PS network; generate a trigger message responsive to the IP-based message, the trigger message including a non-IP-based message including instructions for the receiver to initiate a connection to the PS network; and transmit the trigger message to the receiver via the CS network, and the receiver including logic to initiate a connection to the PS network and to receive the IP-based message responsive to the trigger message.

Some embodiments include one or more of the following features. The trigger message includes instructions for the receiver logic to pull the IP-based message from the serving node via the PS network after initiating the connection to the PS network. The trigger message includes the IP-based message. The trigger message includes instructions for the receiver logic to request the initiator to send any subsequent IP-based messages via the PS network. The initiator includes a network entity. The receiver includes a mobile handset. The initiator includes a mobile handset. The receiver includes a second mobile handset. The trigger message includes an SMS message. The CS network includes a Short Messaging Service Center (SMSC), and the serving node includes logic to transmit the trigger message to the receiver via the SMSC. The CS network includes a Home Location Register (HLR), and the serving node includes logic to obtain location information about the receiver from the HLR. The CS network includes a Home Location Register (HLR), and the serving node includes logic to transmit the trigger message to the receiver via the HLR. The trigger message includes a Push Access Protocol (PAP) message. The CS network includes a Push Proxy Gateway (PPG), and the serving node includes logic to transmit the trigger message to the receiver via the PPG. The PPG transmits the trigger message to the receiver via WAP Push technology. The trigger message includes an Unstructured Supplementary Services Data (USSD) message. The CS network includes a Home Location Register (HLR), and the serving node includes logic to transmit the trigger message to the receiver via the HLR using MAP/TCAP/SS7 protocol. The HLR delivers the trigger message to the receiver using "mobile terminated" call flow procedures.

DETAILED DESCRIPTION

The present invention provides systems and methods for enabling IP signaling in wireless networks. The systems and methods allow IP-based signaling schemes to function in mobile wireless environments without interruption, even if one or more mobile handsets become IP-inaccessible. As mentioned above, in some circumstances a network operator may disconnect a mobile handset from a packet-switched (PS) network by withdrawing its IP address. For example, if a first mobile handset registers to the IMS network, thus obtaining an IP address, but then does not use its IMS connection for a specified period of time, the network may withdraw its IP address and assign that address to a second mobile handset. In this case, the first handset is disconnected from the IMS network, and thus no longer IP accessible until it re-registers to the IMS network. When a handset loses its IP address and is disconnected from the IMS network, it can no longer participate in IP-based services. The present invention provides systems and methods that allow another entity, such as another handset or a network entity, to send an IP-based message to a handset that lacks an IP address, in effect "waking up" the handset and causing it to initiate its own request for an IP address, so that it can receive the IP-based message.

Uses of IP Signaling in Mobile Services

As an example of an IP service that would benefit from user-to-user (handset-to-handset) IP signaling, consider the case in which party A wishes to place a voice call to party B, and to transmit a photograph as part of "call alerting." It is expected that party B will receive the call alert (indicated by "ringing") and the photograph synchronously, e.g., party B may use the photograph to identify the calling party. In order to transmit the image to party 13, party A's handset needs to establish a packet connection to party B's handset and negotiate resources and capabilities. However, if party B's handset is disconnected from the IMS network, party A's handset cannot send the photograph to party B's handset. Further details on this kind of interaction may be found in U.S. patent application Ser. No. 11/504,896, the entire contents of which are incorporated herein by reference.

As an example of an IP service that would benefit from network-to-user (network-to-handset) IP signaling, consider the case in which a network server wishes to transmit a multimedia object to a mobile handset. In order to begin transmitting the object, the server needs to know the capabilities of the handset. If the handset is not IP accessible, the network server may not reach the handset to begin resource negotiation or to transmit the object.

Conditions Under Which Handsets May Not be IP-Accessible

Figure 1:
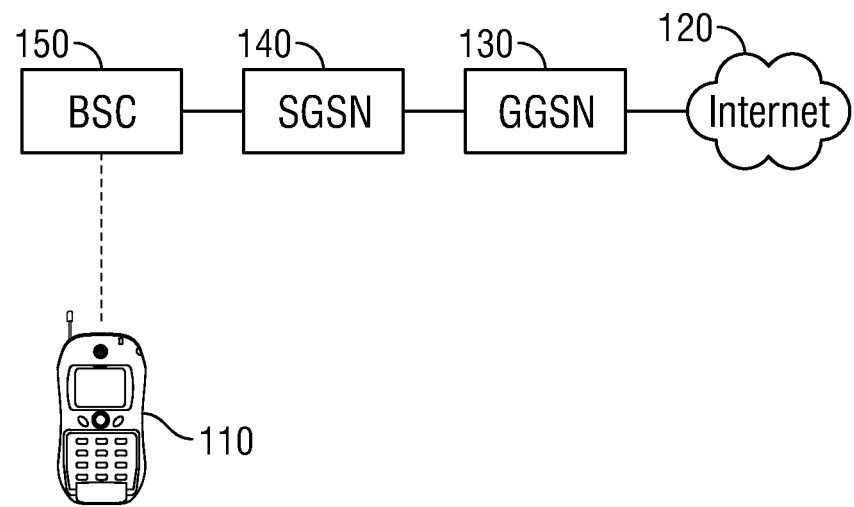
FIG. 1 illustrates a GSM/GPRS packet-switched network architecture.

FIG. 1 depicts components in a GSM/GPRS packet-switched (PS) network, and their communication pathways to an IP network, e.g., the Internet 120, and to handset 110. The GSM/GPRS network includes one or more Base Station Servers (BSC) 150, which are in communication with handset 110, Serving Gateway Support Node (SGSN) 140, and GPRS Gateway Support Node (GGSN) 130, which is in communication with Internet 120. GGSN 130 and SGSN 140 work collaboratively to assign an IP address from Internet 120 to mobile handset 110. Specifically, GGSN 130 communicates with Internet 120, and allocates IP addresses for user handsets, e.g., handset 110. SGSN 140 communicates with GGSN 130 and with base station server (BSC) 150 to provide a wireless connection between handset 110 and Internet 120. When this is accomplished, it is said that mobile handset 110 has a Packet Data Protocol (PDP) context.

Most network operators implement a policy that de-establishes the PDP context of a mobile handset when it is not used. Such de-commissioning is typically implemented within a time period of a few minutes. When the handset loses its PDP context, it does not have an IP address assigned to it and is not reachable by IP-based addressing schemes. At some time in the future, the handset may initiate a data request, causing a new PDP context to be established for this handset, including obtaining a new IP address to the handset. In other words, if a handset lacking an IP address requests an IP connection, then it can initiate that connection, but if another entity requests an IP connection with a handset lacking an IP address, the entity cannot itself establish that connection. It is possible for a network operator to assign a "static" IP address to a mobile handset, so that it will remain connected to the IP network, but this is atypical because IP addresses are a valuable resource in short supply.

Figure 2:
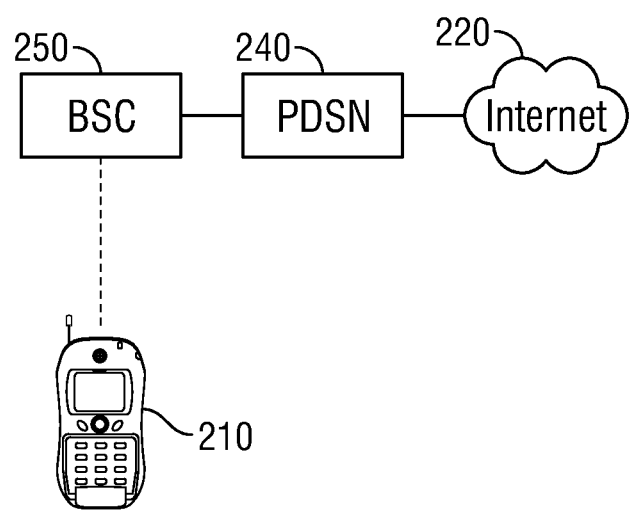
FIG. 2 illustrates a CDMA circuit-switched network architecture.

FIG. 2 depicts components in a CDMA circuit-switched (CS) network, and their communication pathways to an IP network, e.g., Internet 220, and to mobile handset 210. The CDMA network includes one or more Base Station Servers (BSC) 250, which are in communication with handset 210, and Packet Data Serving Node (PDSN) 240, which is in communication with Internet 220. A Point-to-Point protocol (PPP) session exists between the mobile handset 210 and PDSN 240. PDSN 240 acts as a connection point between BSC 250 and an IP network, e.g., Internet 220, by assigning handset 210 an IP address from Internet 220 and providing access to the Internet 220. As practitioners skilled in the art know, the PPP session may be maintained even if the handset goes "dormant," so the handset will remain IP-accessible. An incoming packet for a dormant mobile handset then waits at the packet control function (PCF) upon a "mobile origination" message from the handset in response to overhead messages generated collaboratively by the PCF and the BSC. However, network operators in such networks typically choose to de-allocate IP addresses and tear down the PPP session in order to conserve IP addresses, if the mobile handset does not use its PPP session for a specified period of time. If the mobile handset 210 does not have a PPP session, other entities cannot contact it via the IP network.

Even if a mobile handset is not IP-accessible, e.g., because the GSM/GPRS or CDMA network has de-allocated its IP address, it still has a connection to the circuit-switched (CS) network; as described above, the CS connection can be used to initiate and receive voice calls, SMS and other circuit-switched services.

Systems and Methods for Initiating IP Connectivity to Handsets Lacking IP Addresses As illustrated by the embodiments described below, if a mobile handset lacks an IP address and so cannot be directly contacted by another entity, the handset's existing CS connection can be exploited to cause the handset to initiate its own connection to the PS network. Specifically, a specified message, or "trigger," is sent to the handset via the CS network, instructing logic residing on the handset to initiate a connection to the PS network.

One system that can facilitate this interaction is the Service Delivery Platform (SDP) described in detail in U.S. patent application Ser. No. 11/504,896. Descriptions of other systems and/or components may be found in the incorporated patent references, given below. Briefly, the SDP includes a Serving Node (SN) that communicates with both the CS voice network and the packet-switched IMS network. The SDP also includes a Personal Agent (PA), which is a piece of service logic that resides in the mobile handset(s). The PA and the SN can send messages to each other, e.g., regarding services the user would like to use, the local network environment of the handset, or instructions the SN would like the PA to execute on the handset. Thus, the SDP has one "eye" on the CS voice network and another "eye" on the IMS network.

In the embodiments described herein, the SN sends a trigger over the CS voice network that instructs the PA to request an IP address for the handset, and thus connect to the PS IMS network.

Causing an otherwise IP-inaccessible handset to initiate its own connection to the IP network can be useful in at least the following cases:
1. User-to-user (handset-to-handset) signaling, in which one party (the "initiator") is IP-accessible and the other party (the "receiver") is not IP-accessible.
2. Network-to-user (network-to-handset) signaling, in which the network (the "initiator") is IP-accessible and the other party (the "receiver") is not IP-accessible.

In most embodiments, the initiator is typically aware of, or can obtain, the receiver's phone number (e.g., MSISDN or IMSI), so that it can send a trigger to the receiver's handset via the CS network.

Sending Trigger by Standard SMS

Figure 3:
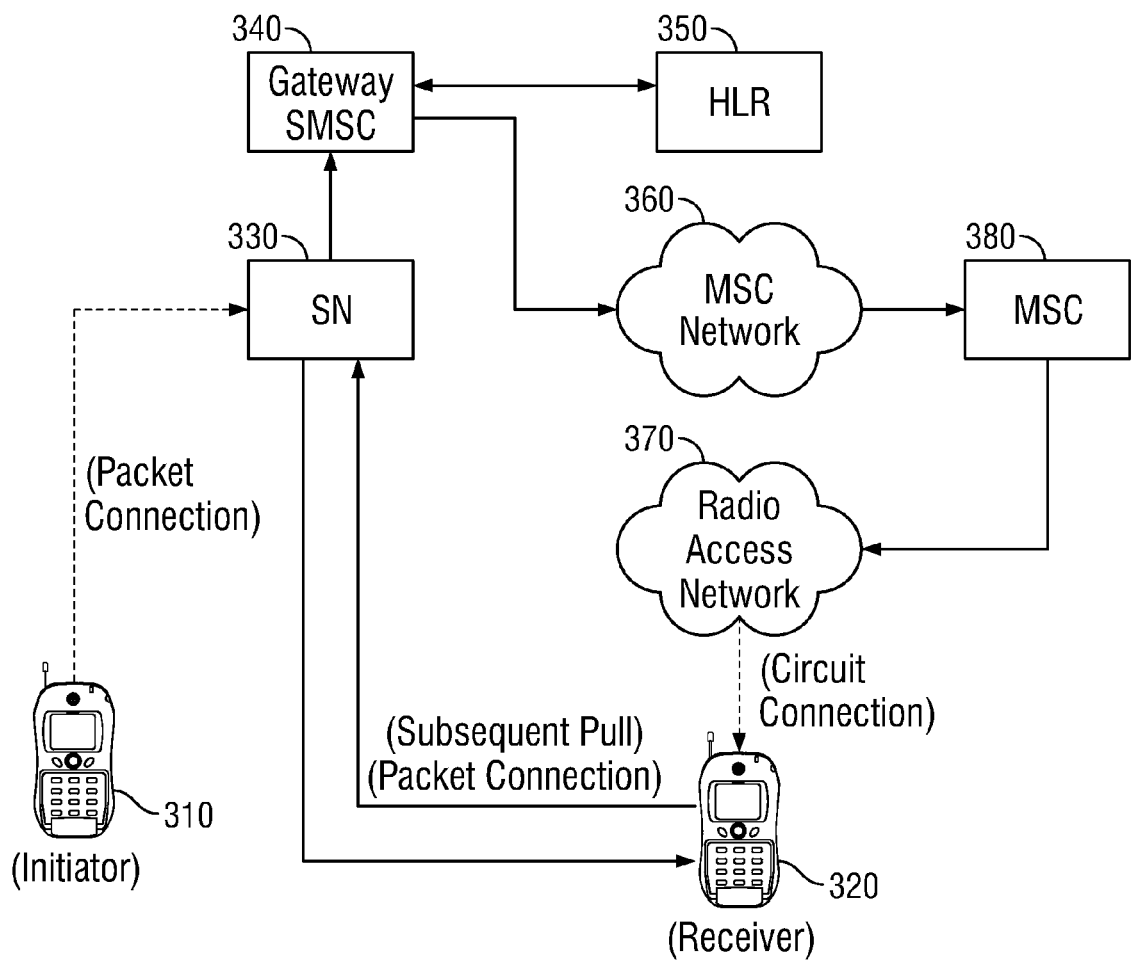
FIG. 3 illustrates a scheme using standard SMS to communicate with a mobile handset lacking an IP address.

In some embodiments, the initiator sends a trigger message to the receiver via Short Message Service (SMS). FIG. 3 illustrates a scheme using standard SMS to communicate with a receiver lacking an IP address.

The scheme illustrated in FIG. 3 includes an initiator's mobile handset ("initiator") 310, a receiver's mobile handset ("receiver") 320, which lacks an IP address, and SN 330. Personal Agent (PA) service logic resides on the initiator 310 and receiver 320, and allows them to communicate with SN 330 via the existing network. However, because receiver 320 lacks an IP address, SN 330 cannot at first communicate with receiver 320 via the PS network. The scheme also includes Gateway SMSC 340, HLR 350, MSC Network 360, Terminating MSC 380, and Radio Access Network 370, which at first is in CS but not PS communication with receiver 320. SN 330 is in communication with Gateway SMSC 340, and may communicate with receiver 320 via Gateway SMSC 340, HLR 350, MSC Network 360, Terminating MSC 380, and Radio Access Network 370. Note that although initiator 310 and receiver 320 are illustrated here as handsets, other kinds of entities, such as network entities, can act as initiators or receivers.

In operation, first initiator 310 constructs an IP-based message, e.g., a multimedia message, that it wishes to send to receiver 320. However, because receiver 320 lacks an IP address, it cannot receive the message by the typical PS network route. Instead, initiator 310 sends the IP-based message to SN 330 via a PS connection. SN 330 is aware that receiver 320 lacks an IP address. Systems and methods for communication between mobile handsets and an SN, and logical components of an SN, are described in greater detail in U.S. patent application Ser. No. 11/504,896.

Logic in SN 330 then processes the incoming IP-based message, and constructs a trigger that, when sent to the receiver, will instruct the receiver to initiate a connection to the PS network. Here, the trigger is in the form of an SMS message. The trigger may also include other instructions, as described in greater detail below.

SN 330 then transmits the trigger to receiver 320 via a Short Messaging Service Center (SMSC), based on the receiver's phone number. Specifically, SN 330 sends the trigger to Gateway SMSC 340, which with information received from the Home Location Register (HLR) 350 routes the trigger to the MSC network 360. MSC network 360 then transmits the trigger, in the form of the SMS message, to the Terminating MSC 380, from whence it is sent via Radio Access Network (RAN) 370, to receiver 320. Note that the SMSC, HLR, and MSC are all components of the CS network, and the RAN transmits the trigger to receiver 320 via a CS connection.

Receiver 320 receives the trigger, and PA logic residing in receiver 320 interprets the trigger. In response, the PA logic activates the receiver's IP connectivity logic and instructs it to initiate an IP connectivity request.

Once receiver 320 is connected to the PS network (the components of which are not shown), it can receive the initial IP-based message, e.g., the multimedia message, in one of at least two ways. For example, the SMS message-based trigger that SN 330 generates may contain the actual intended IP-based message from initiator 310. SMS messages are typically constrained to a size limitation of 160 octets, so if the IP-based message plus the instruction for the receiver to initiate IP connectivity fits within this constraint, it can be efficient to simply include the IP-based message within the trigger. Or, if the IP-based message plus the instruction for the receiver to initiate IP connectivity does not fit within this constraint, SN 330 instead "holds" the IP-based message, and includes in the trigger an instruction for the receiver 320 to subsequently request or "pull" the IP-based message from SN 330. The trigger may also include an instruction for receiver 320 to then request the initiator 310 to transmit any subsequent messages via the typical PS network route.

Note that SMS message delivery may be subject to store-and-forward delays, and delays in transmission through the MSC network. So in certain circumstances where rapid communication is desired, embodiments based on SMS messaging may be less practical than other embodiments described below.

Sending Trigger by WAP Push

Figure 4:
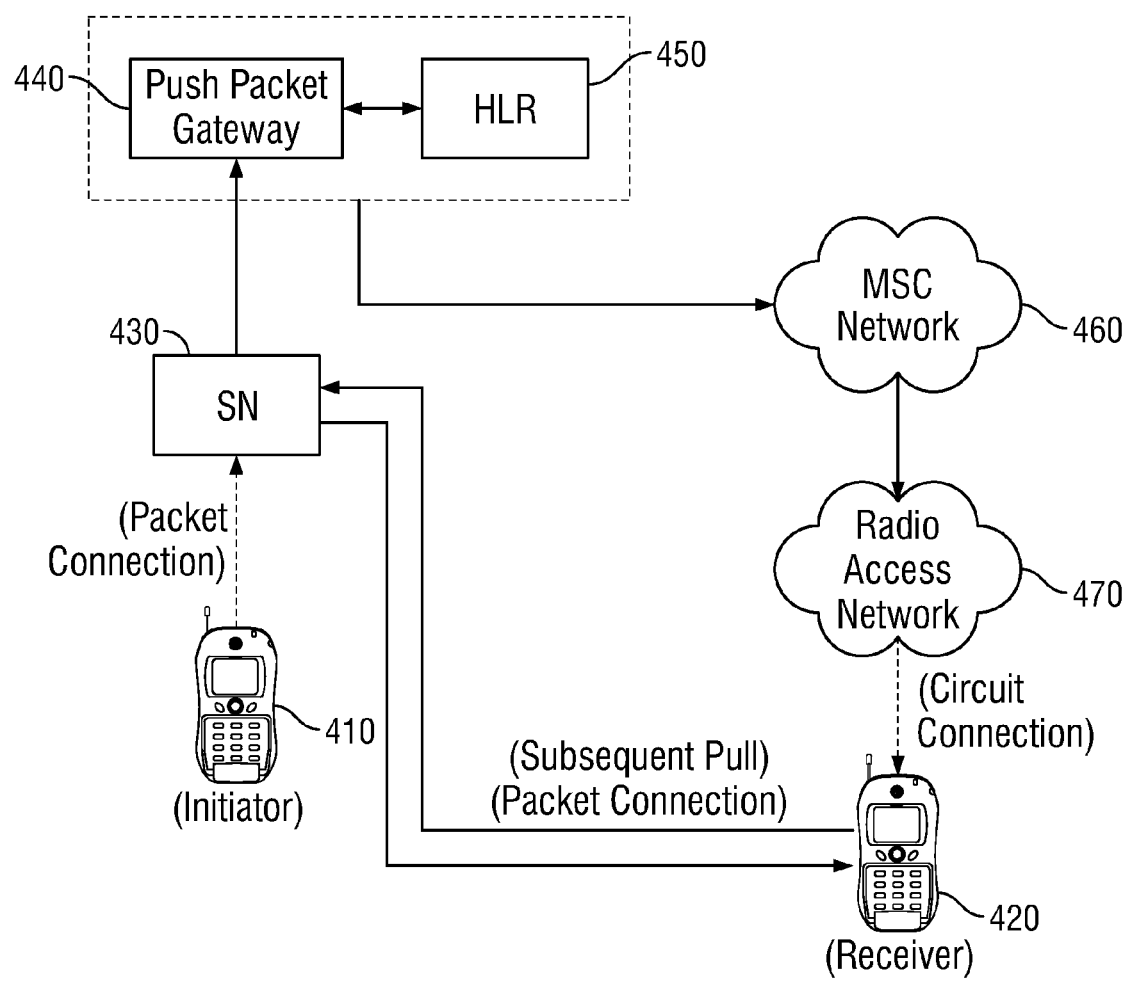
FIG. 4 illustrates a scheme using WAP Push to communicate with a mobile handset lacking an IP address.

In other embodiments, the initiator sends a trigger message to the receiver via Wireless Access Protocol (WAP) Push. FIG. 4 illustrates a scheme using WAP Push to communicate with a receiver lacking an IP address. In WAP Push, a WAP server uses a plug-in in conjunction with the HLR to locate and send information to a handset.

Similarly to the scheme illustrated in FIG. 3, the scheme illustrated in FIG. 4 includes initiator 410, receiver 420, and SN 430. Personal Agent (PA) service logic resides on the initiator 410 and receiver 420, and allows them to communicate with SN 430 via the existing network. However, because receiver 420 lacks an IP address, SN 430 cannot at first communicate with receiver 420 via the PS network. The scheme also includes Push Proxy Gateway 440, HLR 350, MSC Network 460, and Radio Access Network 470, which at first is in CS but not PS communication with receiver 420. SN 430 is in communication with Push Proxy Gateway 440, and may communicate with receiver 420 via Push Proxy Gateway 440, HLR 450, MSC Network 460, and Radio Access Network 470.

In operation, as before, first initiator 410 constructs an IP-based message, e.g., a multimedia message, that it wishes to send to receiver 420. However, receiver 420 lacks an IP address. Initiator 410 transmits the IP-based message to SN 430 via a PS connection. SN 430 is aware that receiver 420 does not have an IP address.

Next, logic residing in SN 430 processes the incoming IP-based message, and constructs a trigger that, when sent to receiver 420, will instruct the receiver to initiate an IP connection. Here, the trigger is in the form of a Push Access Protocol (PAP) message. The trigger may contain other instructions in addition to the IP-connectivity instructions, as described below.

SN 430 then transmits the trigger to receiver 420 via WAP Push. Specifically, SN 430 transmits the trigger to Push Proxy Gateway (PPG) 440, which then delivers the trigger to receiver 420 via WAP Push technology. Note that the PPG, HLR, and MSC are all components of the CS network, and the RAN transmits the trigger to receiver 420 via a CS connection.

Receiver 420 receives the trigger, and PA logic residing in receiver 420 interprets the trigger. In response, the PA logic activates the receiver's IP connectivity logic and instructs it to initiate an IP connectivity request.

Once receiver 420 is connected to the PS network (the components of which are not shown), it can receive the initial IP-based message, e.g., the multimedia message, in one of at least two ways. For example, the PAP-based trigger that SN 430 generates may contain the actual intended IP-based message from initiator 410. PAP messages can be larger than SMS messages, but still limited in size, typically to 1400 characters. Thus, if the IP-based message plus the instruction for the receiver to initiate IP connectivity fits within this constraint, it can be efficient to simply include the IP-based message within the trigger. Or, if the IP-based message plus the instruction for the receiver to initiate IP connectivity does not fit within this constraint, SN 430 instead "holds" the IP-based message, and includes in the trigger an instruction for the receiver 420 to subsequently request or "pull" the IP-based message from SN 430. The trigger may also include an instruction for receiver 420 to then request the initiator 410 to transmit any subsequent messages via the typical PS network route.

Note that in certain circumstances, WAP Push uses SMS delivery technology, and thus may be subject to afore-mentioned delays.

Sending Trigger by SMS Direct

Figure 5:
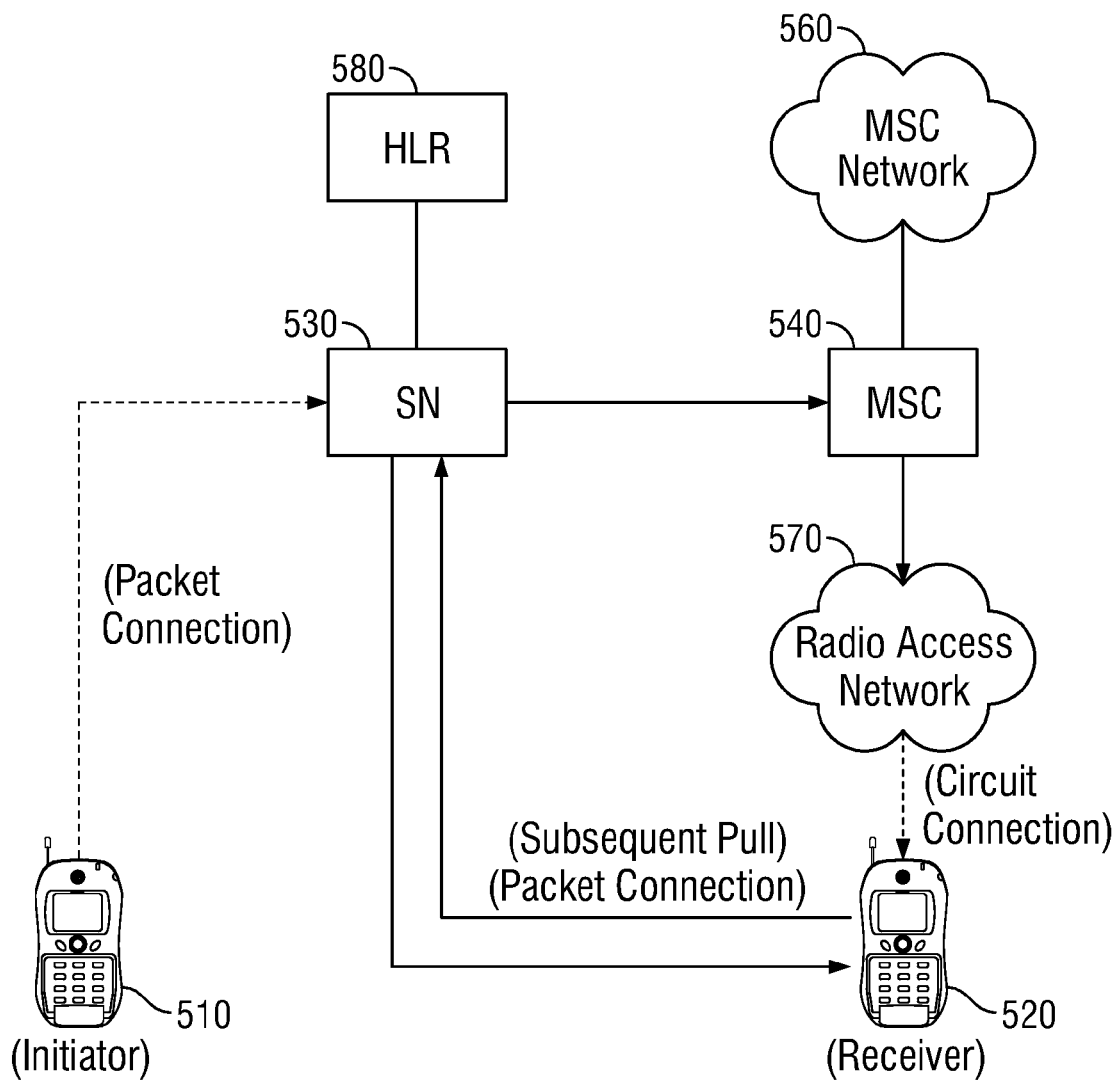
FIG. 5 illustrates a scheme using direct SMS to communicate with a mobile handset lacking an IP address.

Certain embodiments that reduce or eliminate the store-and-forward delays that the above-described embodiments may be susceptible to are illustrated in FIG. 5. These embodiments use SMS-based triggers, but obviate the need for one or more of the network components described above.

FIG. 5 depicts a scheme using SMS Direct to communicate with a receiver lacking an IP address. Like in the schemes described above, the scheme illustrated in FIG. 5 includes initiator 510, receiver 520, and SN 530. Personal Agent (PA) service logic resides on the initiator 510 and receiver 520, and allows them to communicate with SN 530 via the existing network. However, because receiver 520 lacks an IP address, SN 530 cannot at first communicate with receiver 520 via the PS network. The scheme also includes Terminating MSC 540, MSC Network 560, HLR 580 and Radio Access Network, 570, which at first is in CS but not PS communication with receiver 520.

In operation, first initiator 510 constructs an IP-based message intended for receiver 520, and transmits the message to SN 530. SN 530 is aware that receiver 520 lacks an IP address. Logic in SN 530 then processes the incoming IP-based message, and constructs a trigger that, when sent to the receiver, will instruct the receiver to initiate an IP connection. Here, the trigger is in the form of an SMS message. As mentioned above, the trigger can also include other instructions or information.

SN 530 then inquires from the HLR routing information for the receiver (handset). This, for example, can be done by using MAP commands such as PRN (Provide Routing Name information). The HLR response identifies the Terminating MSC that is capable of transmitting the trigger to the receiver. SN 530 transmits the trigger to receiver 520 via MSC 540 based on the receiver's phone number. Here, Gateway MSC 540 includes internal routing logic that locates receiver 520 in real time, so that the trigger need not be first transmitted to a SMSC that then locates the receiver and routes it through the MSC network (which may include multiple hops and internal queues) as in the embodiment illustrated in FIG. 3. This obviates at least some of the delays associated with conventional SMS delivery. After finding receiver 520, MSC 540 then transmits the trigger to receiver 520.

In response to the trigger, PA logic residing in receiver 520 activates the receiver's IP connectivity logic and instructs it to initiate an IP connectivity request. As for the SMS-based embodiment illustrated in FIG. 3, the trigger may also include the original IP-based message or instructions for the receiver 520 to "pull" the message from SN 530 over the PS network.

Sending Trigger by USSD

Figure 6:
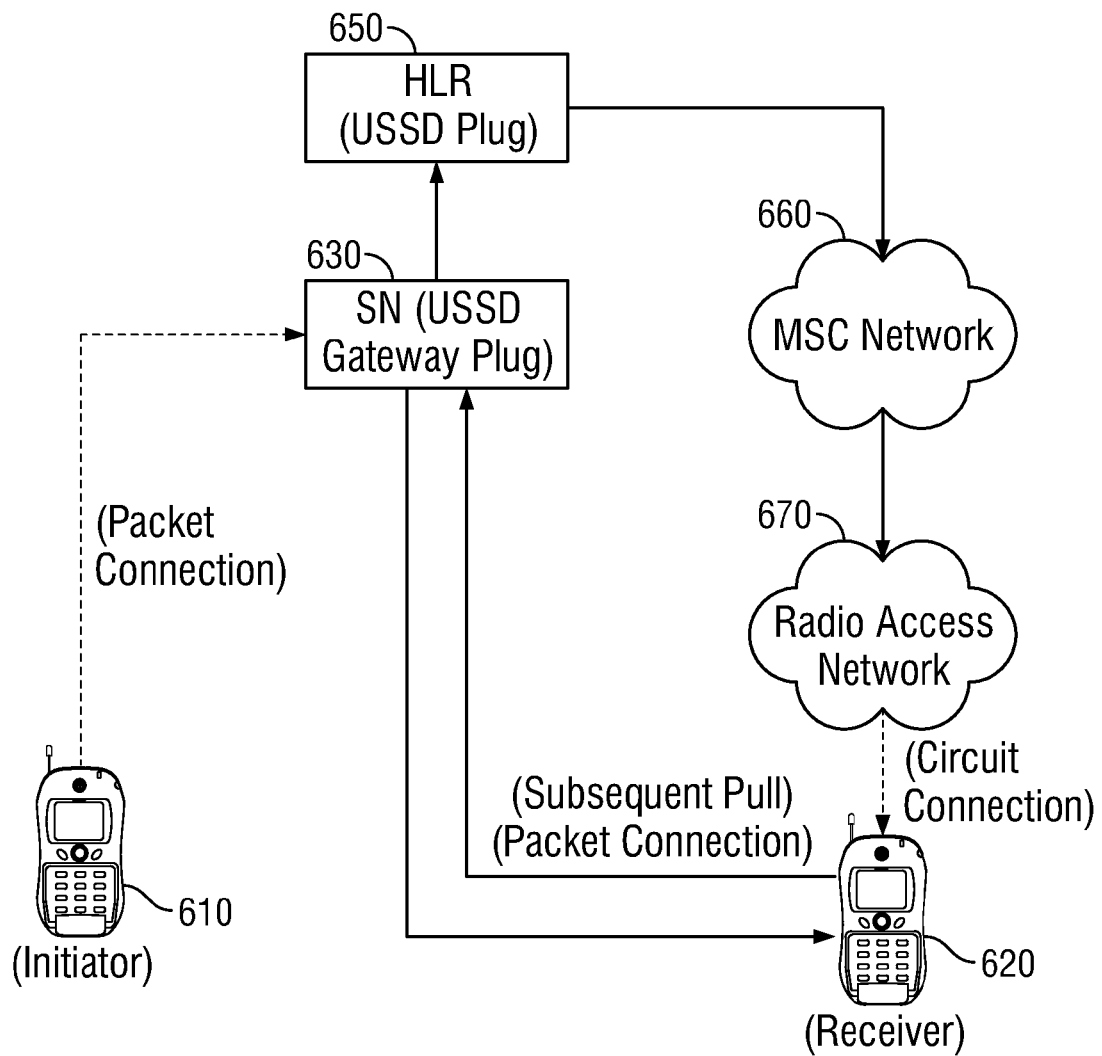
FIG. 6 illustrates a scheme using USSD delivery to communicate with a mobile handset lacking an IP address.

FIG. 6 illustrates another scheme that reduces or eliminates the store-and-forward delays to which other embodiments may be susceptible. Instead of using SMS- or WAP push-based methods, the scheme shown in FIG. 6 uses Unstructured Supplementary Service Data (USSD) Delivery. In USSD delivery, an SMSC is not present in the processing path, which can improve the delivery time of a message. USSD delivery is typically associated with real-time services such as instant messaging in GSM/GPRS networks.

FIG. 6 depicts a scheme using USSD to communicate with a receiver lacking an IP address. Like in the schemes described above, the scheme illustrated in FIG. 6 includes initiator 610, receiver 620, and SN 630. Personal Agent (PA) logic resides on initiator 610 and receiver 620, and allows them to communicate with SN 630 via the existing network. However, because receiver 620 lacks an IP address, SN 630 cannot at first communicate with receiver 620 via the PS network. Here, SN 630 is modified with a USSD Server. A USSD server is service logic that pushes information to a handset via a set of services provided by the HLR. These services are typically contained in a module called the USSD plug and is typically integrated into the HLR. The scheme also includes HLR 750, MSC Network 760, and Radio Access Network 770, which at first is in CS but not PS communication with receiver 720. HLR is modified with a USSD Plug. SN 730 is in communication with HLR 750, and may communicate with receiver 720 via HLR 750, MSC Network 760, and Radio Access Network 770.

In operation, first, initiator 710 constructs an IP-based message intended for receiver 720, and transmits the message to SN 730. SN 730 is aware that receiver 720 lacks an IP address. Logic in SN 730 then processes the incoming IP-based message, and constructs a trigger that, when sent to the receiver, will instruct the receiver to initiate an IP connection. This trigger is in the form of a USSD message. The trigger can also include other instructions or information.

SN 730 then transmits the trigger to HLR 750, using MAP/TCAP/SS7 protocol, based on the receiver's phone number. HLR 750 then determines the location of receiver 720, and uses the USSD Plug to forward the trigger using "mobile terminated call flow procedures." This involves forwarding the trigger to MSC network 760, which then transmits the trigger via Radio Access Network 770, to receiver 720. Note that these "mobile terminated call flow procedures" are carried by the SS7 network in real time.

In response to the trigger, PA logic residing in receiver 720 activates the receiver's IP connectivity logic and instructs it to initiate an IP connectivity request. The trigger may also include the original IP-based message or instructions for the receiver 720 to "pull" the message from SN 730 over the PS network.

Embodiments of the present invention build on techniques, systems and methods disclosed in earlier filed applications, referred to herein as the "incorporated patent references," including but not limited to the following references, the entire contents of which are incorporated herein by reference:

U.S. patent application Ser. No. 11/166,470, filed Jun. 24, 2005, entitled System and Method to Provide Dynamic Call Models for Users in an IMS Network;

U.S. patent application Ser. No. 11/166,407, filed Jun. 24, 2005, entitled Method and System for Provisioning IMS Networks with Virtual Service Organizations Having Distinct Service Logic;

U.S. patent application Ser. No. 11/166,456, filed Jun. 24, 2005, entitled Method of Avoiding or Minimizing Cost of Stateful Connections Between Application Servers and S-CSCF Nodes in an IMS Network with Multiple Domains;

U.S. patent application Ser. No. 11/166,406, filed Jun. 24, 2005, entitled Mediation System and Method for Hybrid Network Including an IMS Network;

U.S. Provisional Patent Application No. 60/735,112, filed Nov. 9, 2005, entitled System and Method to Allow Interruption of Unicast Data Service Utilizing a Class B Handset or a Dual Mode Handset (DMH) to Inform it of a Circuit-Based Incoming Call, so the Handset Can Accept the Call if the User Desires;

U.S. patent application Ser. No. 11/283,038, filed Nov. 18, 2005, entitled System and Method of Interworking Non-IMS and IMS Networks to Create New Services Utilizing Both Networks;

U.S. patent application Ser. No. 11/283,042, filed Nov. 18, 2005, entitled System and Method to Mediate Delivery of Legacy, Non-IMS Services into an IMS Network;

U.S. patent application Ser. No. 11/282,924, filed Nov. 18, 2005, entitled IMS Networks with AVS Sessions with Multiple Access Networks;

U.S. Provisional Patent Application No. 60/776,137, filed Feb. 23, 2006, entitled Enabling Combinational Services in Networks that Do Not Support Multiple Radio Access Bearers;

U.S. Provisional Patent Application No. 60/779,954, filed Mar. 7, 2006, entitled Using Telephony Interface for Invoking Data Services in Wireless Communication Networks;

U.S. patent application Ser. No. 11/370,793, filed Mar. 8, 2006, entitled Digital Home Networks Having a Control Point Located on a Wide Area Network;

U.S. patent application Ser. No. 11/370,594, filed Mar. 8, 2006, entitled Associated Device Discovery in IMS Networks;

U.S. Provisional Patent Application No. 60/800,688, filed May 16, 2006, entitled System and Method for Supporting Combinational Services Without Simultaneous Packet and Circuit Connections;

U.S. Provisional Patent Application No. 60/809,029, filed May 26, 2006, entitled System and Method for Supporting Combinational Services Without Simultaneous Packet and Circuit Connections; and U.S. patent application Ser. No. 11/504,896, filed Aug. 16, 2006, entitled System and Method for Enabling Combinational Services in Wireless Networks by Using a Service Delivery Platform.

The present techniques, however, are not limited to systems and methods disclosed in the incorporated patent references. Thus, while reference to such systems and applications may be helpful, it is not believed necessary to understand the present embodiments or inventions.

It will be further appreciated that the scope of the present invention is not limited to the above-described embodiments, but rather is defined by the appended claims, and that these claims will encompass modifications of and improvements to what has been described.

What is claimed is:

1. A method of receiving an IP-based message from an initiator via a packet-switched (PS) network capable of communicating IP-based messages, a circuit-switched (CS) network capable of communicating non-IP-based messages, and a serving node in communication with the PS network and the CS network, the method comprising:

receiving a trigger message from the serving node over the CS network, the trigger message comprising a non-IP-based message that includes instructions for the receiver to initiate a connection to the PS network and instructions for the receiver to obtain an IP-based message from the serving node, the IP-based message being sent by the initiator and intended for receipt by the receiver;

sending a request from the receiver for initiating a connection to the PS network;

responsive to the trigger message, pulling the IP-based message from the serving node via the PS network after initiating the connection to the PS network.

2. The method of claim 1, wherein the trigger message comprises the IP-based message.

3. The method of claim 1, wherein the trigger message comprises instructions for the receiver to request the initiator to send any subsequent IP-based messages via the PS network.

4. The method of claim 1, wherein the initiator comprises a network entity.

5. The method of claim 4, wherein the receiver comprises a mobile handset.

6. The method of claim 1, wherein the initiator comprises a mobile handset.

7. The method of claim 6, wherein the receiver comprises a second mobile handset.

8. The method of claim 1, wherein the trigger message comprises a Short Message Service (SMS) message.

9. The method of claim 8, wherein the receiver receives the trigger message from the serving node via a Short Messaging Service Center (SMSC) in the CS network.

10. The method of claim 8, wherein the serving node obtains location information about the receiver from a Home Location Register (HLR) and then transmits the trigger message to the receiver via the CS network.

11. The method of claim 1, wherein the receiver receives the trigger message from the serving node via a Home Location Register (HLR) in the CS network.

12. The method of claim 1, wherein the trigger message comprises a Push Access Protocol (PAP) message.

13. The method of claim 12, wherein the receiver receives the trigger message from the serving node via a Push Proxy Gateway (PPG) in the CS network.

14. The method of claim 13, wherein the trigger message is received from the PPG via a wireless access protocol WAP Push technology.

15. The method of claim 1, wherein the trigger message comprises an Unstructured Supplementary Services Data (USSD) message.

16. The method of claim 15, wherein the trigger message is received from a Home Location Register (HLR) in the CS network using a MAP/TCAP/SS7 protocol.

17. The method of claim 16, wherein the trigger message is delivered to the receiver by the HLR using "mobile terminated" call flow procedures.

18. A system for receiving an IP-based message from an initiator via a packet-switched (PS) network capable of communicating IP-based messages and a circuit-switched (CS) network capable of communicating non-IP-based messages, the system comprising:
- a receiver lacking an IP address in communication with the CS network, the receiver comprising logic stored in a computer readable medium configured to:
  - receive a trigger message from a serving node over the CS network, the serving node being in communication with the PS network and the CS network, the trigger message comprising a non-IP-based message that includes instructions for the receiver to initiate a connection to the PS network and instructions for the receiver to obtain the IP-based message from the serving node, the IP-based message being sent by the initiator and intended for receipt by the receiver;
  - send a request for initiating a connection to the PS network; and
  - responsive to the trigger message, pull the IP-based message from the serving node via the PS network after initiating the connection to the PS network.

19. The system of claim 18, wherein the trigger message comprises the IP-based message.

20. The system of claim 18, wherein the trigger message comprises instructions for the receiver logic to request the initiator to send any subsequent IP-based messages via the PS network.

21. The system of claim 18, wherein the initiator comprises a network entity.

22. The system of claim 21, wherein the receiver comprises a mobile handset.

23. The system of claim 18, wherein the initiator comprises a mobile handset.

24. The system of claim 23, wherein the receiver comprises a second mobile handset.

25. The system of claim 18, wherein the trigger message comprises a Short Message Service (SMS) message.

26. The system of claim 25, wherein the CS network comprises a Short Messaging Service Center (SMSC), and wherein the serving node comprises logic to transmit the trigger message to the receiver via the SMSC.

27. The system of claim 25, wherein the CS network comprises a Home Location Register (HLR), and wherein the serving node comprises logic to obtain location information about the receiver from the HLR.

28. The system of claim 18, wherein the CS network comprises a Home Location Register (HLR), and wherein the serving node comprises logic to transmit the trigger message to the receiver via the HLR.

29. The system of claim 18, wherein the trigger message comprises a Push Access Protocol (PAP) message.

30. The system of claim 29, wherein the CS network comprises a Push Proxy Gateway (PPG), and wherein the serving node comprises logic to transmit the trigger message to the receiver via the PPG.

31. The system of claim 30, wherein the receiver receives the trigger message from the PPG via wireless access protocol WAP Push technology.

32. The system of claim 18, wherein the trigger message comprises an Unstructured Supplementary Services Data (USSD) message.

33. The system of claim 32, wherein the CS network comprises a Home Location Register (HLR), and wherein the serving node comprises logic to transmit the trigger message to the receiver via the HLR using MAP/TCAP/SS7 protocol.

34. The system of claim 33, wherein the receiver receives the trigger message from the HLR, wherein the HLR uses "mobile terminated" call flow procedures.

\* \* \* \* \*